(12) United States Patent
Kato (10) Patent No.: US 9,134,794 B2
(45) Date of Patent: Sep. 15, 2015

(54) SYSTEM TO IDENTIFY USER AND DEVICE THE USER IS INTENDING TO OPERATE

(71) Applicants: KABUSHIKI KAISHA TOSHIBA, Tokyo (JP); Toshiba Tec Kabushiki Kaisha, Tokyo (JP)

(72) Inventor: Hiroyuki Kato, Tokyo (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 0 days.

(21) Appl. No.: 13/971,699

(22) Filed: Aug. 20, 2013

(65) Prior Publication Data

US 2015/0055168 A1    Feb. 26, 2015

(51) Int. Cl.
G06F 3/12    (2006.01)
G06F 3/01    (2006.01)
H04N 1/00    (2006.01)
G06K 15/00    (2006.01)

(52) U.S. Cl.
CPC .............. *G06F 3/011* (2013.01); *G06F 3/1222* (2013.01); *G06F 3/1238* (2013.01); *G06F 3/1285* (2013.01); *G06K 15/005* (2013.01); *H04N 1/0035* (2013.01)

(58) Field of Classification Search
CPC ..... G06F 3/011; G06F 3/1222; G06F 3/1238; G06F 3/1285; H04N 1/003; G06K 15/005
USPC ........ 358/1.1, 1.13, 1.14, 1.15, 402; 382/117, 382/118; 709/225, 229
See application file for complete search history.

(56) References Cited

U.S. PATENT DOCUMENTS

| 6,111,580 A * | 8/2000 | Kazama et al. ............... 715/863 |
| 6,836,843 B2 * | 12/2004 | Seroussi et al. ............... 713/173 |
| 8,090,254 B2 * | 1/2012 | Wang ............................. 396/263 |
| 2006/0056666 A1 | 3/2006 | Mizutani et al. |
| 2008/0273764 A1 * | 11/2008 | Scholl ........................... 382/118 |
| 2012/0242800 A1 * | 9/2012 | Ionescu et al. ................. 348/46 |
| 2013/0265448 A1 * | 10/2013 | Li .............................. 348/207.1 |

FOREIGN PATENT DOCUMENTS

| JP | 2009037434 A | 2/2009 |
| JP | 2012185833 A | 9/2012 |

* cited by examiner

*Primary Examiner* — Gabriel Garcia
(74) *Attorney, Agent, or Firm* — Patterson & Sheridan, LLP (57) ABSTRACT

A system to manage operation of plural devices has an acquiring unit configured to acquire information from a user giving a physical signal to use one of the devices, a user identification unit configured to identify the user based on the information acquired by the acquiring unit, a device identification unit configured to identify a device the user intends to use based on the information acquired by the acquiring unit, a signal identification unit configured to identify the physical signal based on the information acquired by the acquiring unit, and a control unit configured to recognize the meaning of the physical signal based on the identified user, identified device, and identified physical signal, and transmit a control signal corresponding to the physical signal to the identified device.

20 Claims, 8 Drawing Sheets

| CALL GESTURE | SELECT GESTURE | OPERATION GESTURE (PRINT IMPLEMENTATION; ONLY THIS JOB SAVED IN QUEUE) | OPERATION GESTURE 2 (PRINT IMPLEMENTATION; ALL JOBS SAVED IN QUEUE) |
|---|---|---|---|
| WAVE HAND TO LEFT AND RIGHT | POINT AT THE CONTROL TARGET DEVICE | INDEX FINGER UP | THUMB UP |

FIG. 10

| OPERATION TARGET DEVICE A | CALL GESTURES | SELECT GESTURES | OPERATION GESTURES |
|---|---|---|---|
| USER A | WAVE HAND LEFT AND RIGHT | POINT AT CONTROL TARGET DEVICE | THUMB UP |
| USER B | COME HERE GESTURE WITH HAND | SHOW PALM OF HAND TOWARD CONTROL TARGET DEVICE | INDEX FINGER UP |
| USER C | STAND UP FROM SEATED STATE | COME HERE GESTURE TOWARD CONTROL TARGET DEVICE | 5 FINGERS UP (OPEN HAND) |
| OPERATION TARGET DEVICE B | CALL GESTURES | SELECT GESTURES | OPERATION GESTURES |
| USER A | WAVE HAND LEFT AND RIGHT | POINT AT CONTROL TARGET DEVICE | THUMB UP |
| USER B | STAND UP FROM SEATED STATE | COME HERE GESTURE TOWARD CONTROL TARGET DEVICE | 5 FINGERS UP (OPEN HAND) |
| USER C | COME HERE GESTURE WITH HAND | SHOW PALM OF HAND TOWARD CONTROL TARGET DEVICE | INDEX FINGER UP |
| OPERATION TARGET DEVICE C | CALL GESTURES | SELECT GESTURES | OPERATION GESTURES |
| USER A | STAND UP FROM SEATED STATE | COME HERE GESTURE TOWARD CONTROL TARGET DEVICE | 5 FINGERS UP (OPEN HAND) |
| USER B | COME HERE GESTURE WITH HAND | SHOW PALM OF HAND TOWARD CONTROL TARGET DEVICE | INDEX FINGER UP |
| USER C | WAVE HAND LEFT AND RIGHT | POINT TO CONTROL TARGET DEVICE | THUMB UP |

SYSTEM TO IDENTIFY USER AND DEVICE THE USER IS INTENDING TO OPERATE

FIELD

Embodiments described herein relate generally to a system to manage operation of plural devices.

BACKGROUND

Conventionally, a user selects one device from multiple devices and controls the ON-OFF state and other features thereof, by a selection method and an operating method of the selected device. As one such method, a method using space hand gestures has been proposed. In this method, the user's hand gestures are captured by a camera and the device the user has selected is recognized by processing image information from the captured image. The devices that are selected and operated in this manner include an illumination tool, an opening and closing drive section of a curtain, a CD player, a television, and a video system, where one person is assumed to select and operate the different devices and the one person is not distinguished from other persons who may select and operate the different devices.

Because of this, it is not possible for multiple users to select a specific device and operate it according to his or her gesture, and to limit the user of the specific device to particular user or users.

DETAILED DESCRIPTION

Embodiments provide a system for operating a plurality of devices that allows multiple users to operate one or more devices according to their gesture.

According to one embodiment, a system to manage operation of plural devices has an acquiring unit configured to acquire information from a user giving a physical signal to use one of the devices, a user identification unit configured to identify the user based on the information acquired by the acquiring unit, a device identification unit configured to identify a device the user intends to use based on the information acquired by the acquiring unit, a signal identification unit configured to identify the physical signal based on the information acquired by the acquiring unit, and a control unit configured to recognize the meaning of the physical signal based on the identified user, identified device, and identified physical signal, and transmit a control signal corresponding to the physical signal to the identified device.

Hereinafter, we will explain the selection system for devices according to the embodiment, referring to the drawings.

Figure 1:
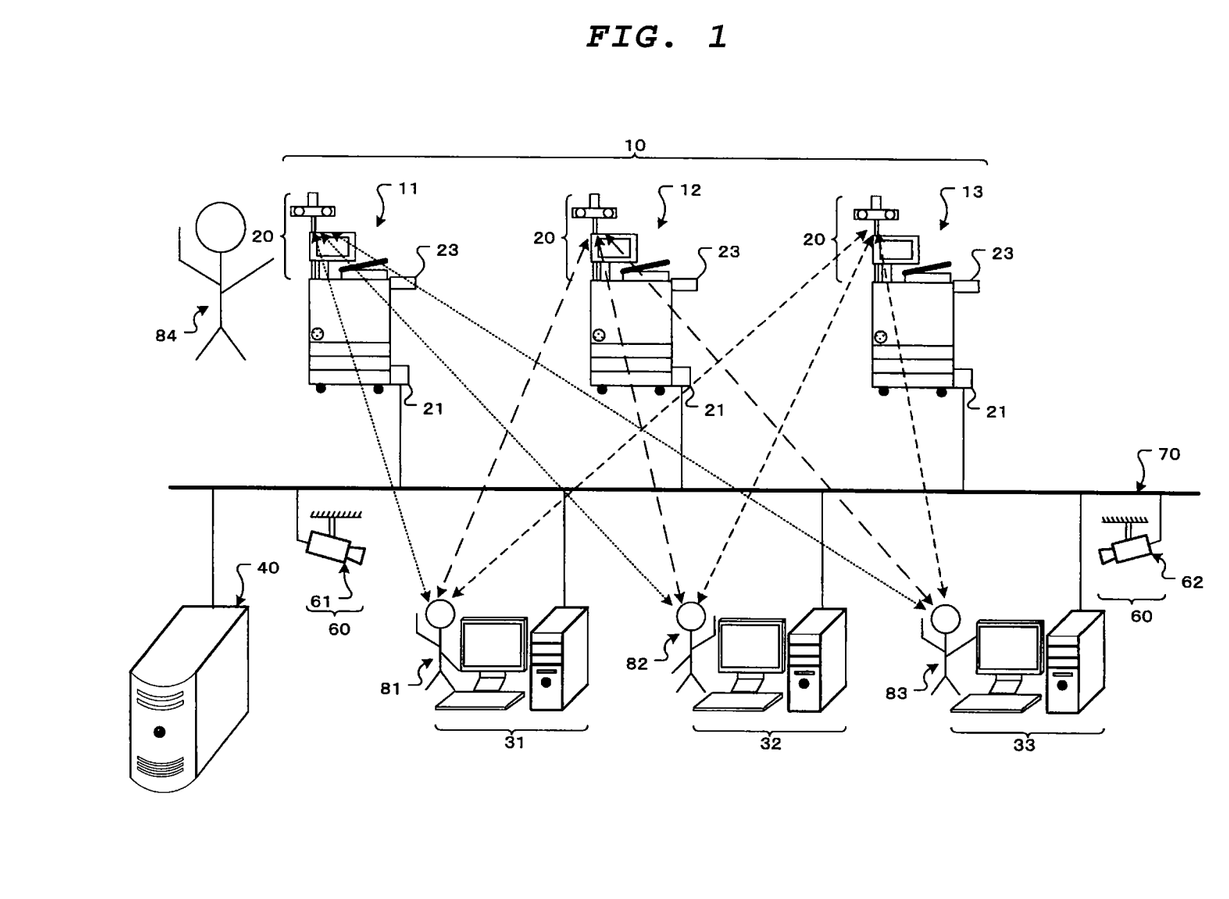
FIG. 1 shows a structure of a device selection system according to an embodiment.
Figure 2:
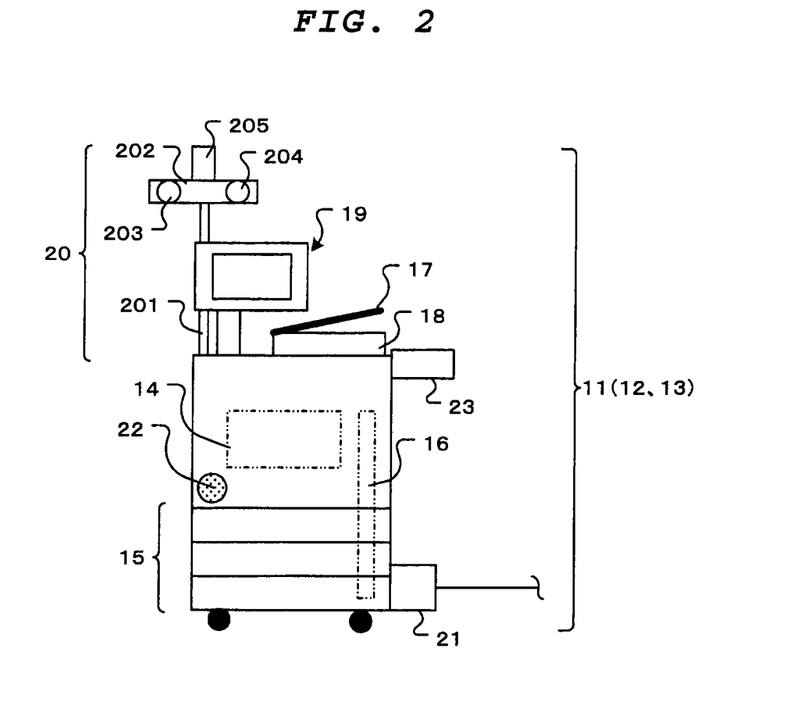
FIG. 2 is a front view of a target device to be operated in the system of FIG. 1.

FIG. 1 shows the structure of a device selection system according to an embodiment, and FIG. 2 is a front view of a target device to be operated in the system of FIG. 1.

In FIG. 1, there are multiple information processing devices 11, 12, 13 comprising a control target device group 10, multiple personal computers (PC) 31, 32, 33, a server 40, and plurality of cameras 61, 62 comprising an outside camera group 60, all of which are connected to a network 70.

The multiple information processing devices 11, 12, 13, are described as a multi function peripheral (MFP) which performs multiple functions, for example, a scanner function, a printer function, a web browser function, and a FAX function etc. Also, the multiple MFPs 11, 12, 13 can, for example, be arranged all together in one place in the office, or they can be scattered into suitable places. Moreover, it is acceptable for not all MFPs to be equipped with the same functions; for example, only one of the MFP may be equipped with a developer unit that accommodates both an erasable toner and a non-erasable toner.

In the MFPs 11, 12, 13, as shown in FIG. 2, in this embodiment, the device itself has an image formation section 14, a paper storage section 15 to store printer papers, and a paper transport section 16 to convey the paper from the paper storage section 15 to the image formation section 14, and discharge the paper to the outside of the device. Also, the device has, a scanner section 18 which reads manuscripts placed on a copyholder glass and manuscripts conveyed from a manuscript automatic supply section 17, an operation panel 19 equipped with an operation section and a display section, a gesture recognition section 20 which recognizes the user's gestures, such as hand-gestures; a network interface 21, a speaker 22, and a card authentication section 23.

The operation panel 19 is, in order to operate the MFPs 11 (12, 13), for example, in the case of network printing, able to store a job temporarily in a queue. The user will allow, by operating the operation panel 19, the job that is stored in the queue to be executed. This function that stores the print job in the queue is effective as a prevention method of information leakage. That is to say, if a job is executed at the moment of the job being received without storing it, and if the printed paper is left for a long period of time in a printer ejection section of the MFP, there is a chance of it being seen by a third party. Because of this, when the user holds up his/her own authentication card to the card authentication section 23 of the MFP selected by the user, the user's print job stored in the server 40 will be executed by the MFP appropriately selected. FIG. 1 shows, as an example, a state that a D user 84 is holding up his authentication card to the card authentication section 23 and waiting for the printing.

On the other hand, A, B, C operators 81, 82, 83, who are facing the PCs 31, 32, 33, and the MFPs 11, 12, 13 are in a range in which the hand gestures of the operators 81, 82, and 83 is recognizable by the gesture recognition section 20 of the MFPs 11, 12, 13, for example within a range of a few meters to tens of meters. The A user 81 and the PC 31, the B user 82 and the PC 32, and the C user 83 and the PC 33 are correlated, and data for printing from the PCs 31-33 are stored in the server 40.

The gesture recognition section 20 includes a color camera 203 and an infrared camera 204 which recognizes the depth of a photographed film image, on a horizontal bar 202 placed on a top section of a support post 201. Also, at the top of the support post 201, an indicator lamp 205 is provided. When the MFP gesture recognition section 20 detects the gesture, the MFP indicator lamp 205 lights up and communicates the control state of an MFP, which is the control target device, to the user. For example, when the MFP is a target of a call, to show the call from a user, the lamp of the MFP will light up. In this embodiment, the indicator lamp 205 will flash when the MFP of the lamp is the target of the call; the light will be steady when in a selection state; and the lamp will be unlit when in a waiting state. Also, it is possible to announce the control state by voice using the speaker 22.

Figure 3:
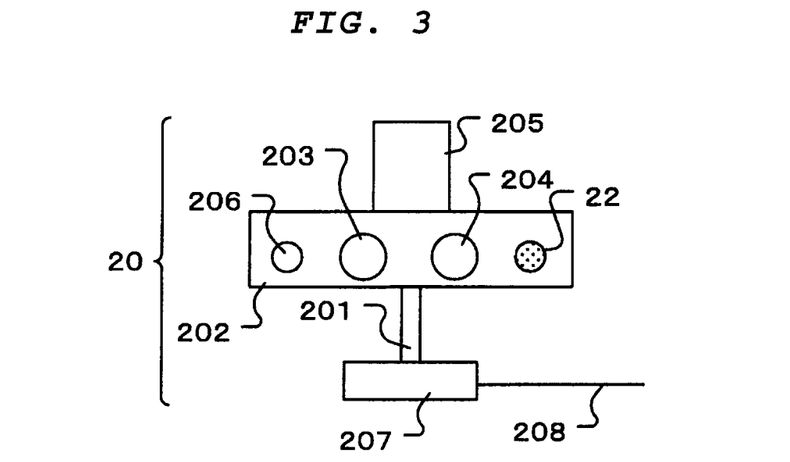
FIG. 3 is a detailed diagram of a photograph section of the system of FIG. 1.

The color camera 203 and the infrared camera 204 photograph the inside of an office within a wide angle range, enabling a face recognition of the multiple users 81-83 at the same time. Also, the gesture recognition section 20, as shown in FIG. 3, can be constructed as a separate discreet part of the MFPs 11-13, for example, so that the support post 201 is placed on a base 207, and a microphone 206 is further provided on the horizontal bar 202 that is at the top section of the support post 201. The microphone 206 is used for the voice recognition of the operator.

In this embodiment, by providing the gesture recognition section 20 on each MFP, when the users 81-83 gesture toward the MFP in order to obtain an operation authority, the cameras 203, 204 of the MFP can recognize with certainty that there is an intention to obtain authority. The color camera 203 obtains video image data for the facial recognition of the users 81-83. As the user is captured as a video image by the color camera 203, the infrared camera 204 obtains data for the identification of the subject depth and gestures.

Also, by properly placing the cameras 61, 62 constituting the outside camera group 60 on the office ceiling and walls, and the personal computers 31, 32, 33, and by photographing the users, the cameras may recognize in the same way as the gesture recognition section 20, or be used as a support for the gesture recognition section 20.

Figure 4:
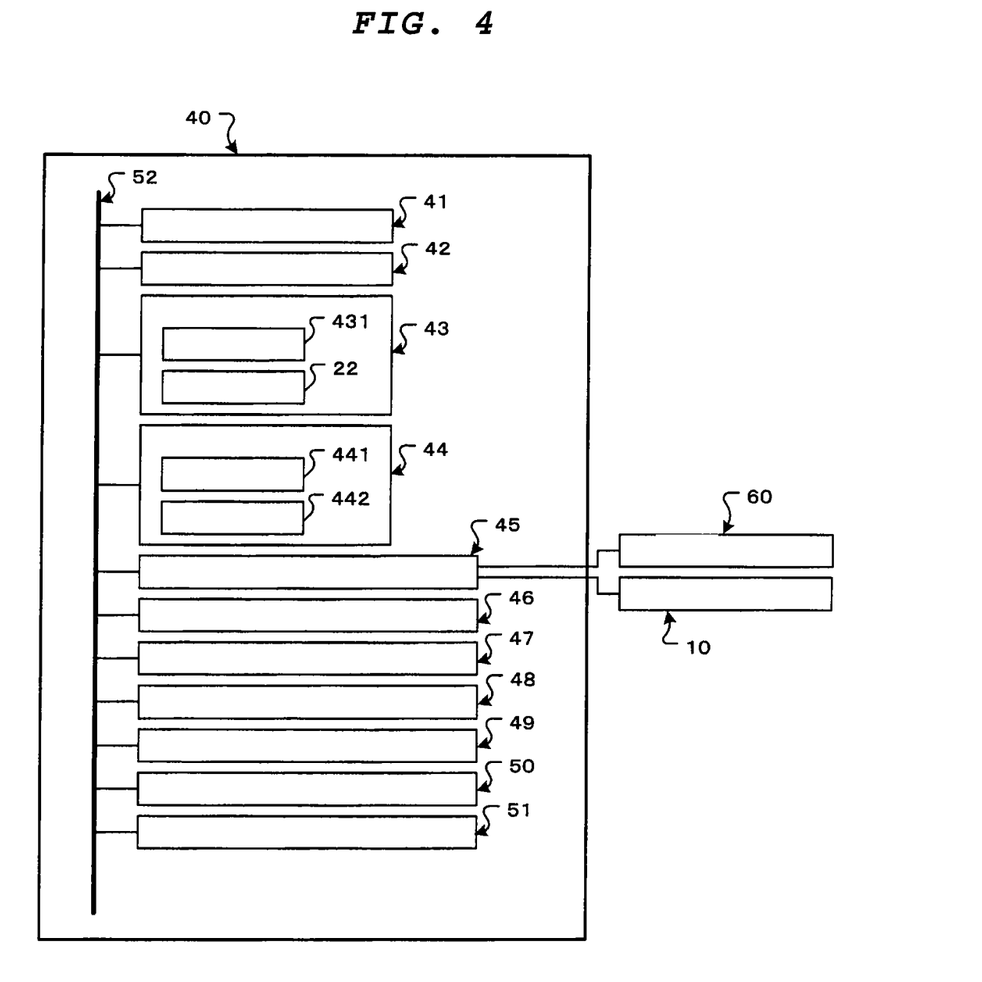
FIG. 4 is a functional block diagram of the system of FIG. 1.

The server 40, as shown in FIG. 4, connects a processor 41, a memory section 42, an output section 43 including a display 431 and the speaker 22, an input section 44, a network interface section 45, a multiple users individual identification section 46, a multiple simultaneous gesture detection section 47, a gesture determination section 48, a device selection propriety decision section 49, a device selection completion notification section 50, and a device operation section 51 responding to gestures, to a line 52.

The processor 41 makes many decisions related to the server 40, and sends instructions to the other sections. The memory section 42 stores information used by the processor 41 sending the instructions. The input section 44 is used as a user interface to receive operation instructions from a keyboard 441 and a mouse 442 operated by the A-C users 81-83. A display 431 of the output section 43 is an output device for the user interface and shows information to the user. The network interface section 45 performs input/output between the MFPs 11-13, which are the control target devices, and the network 70, and connects each camera 61, 62 within the outside camera group 60 to each MFP 11-13 of the control target device group 10.

The multiple users individual identification section 46, from photographic information from the cameras, voice information from the microphone, and, facial image information and voice information of the users 81-83 recorded in advance, identifies the user through a facial recognition process and a vocal recognition process.

The multiple simultaneous gesture detection section 47 detects multiple user gestures at the same time in real time.

Figure 9:
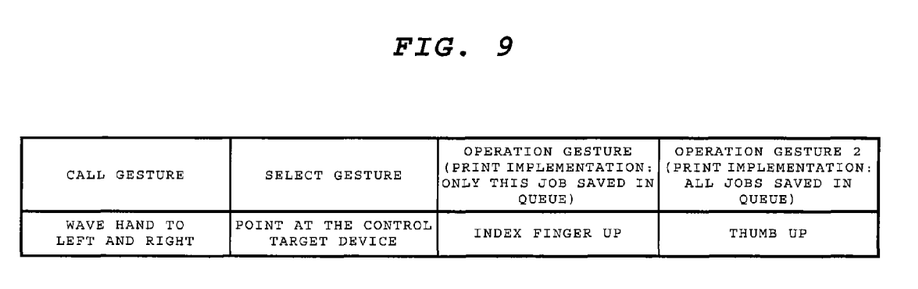
FIG. 9 shows one example of the definition of a gesture.
Figure 10:
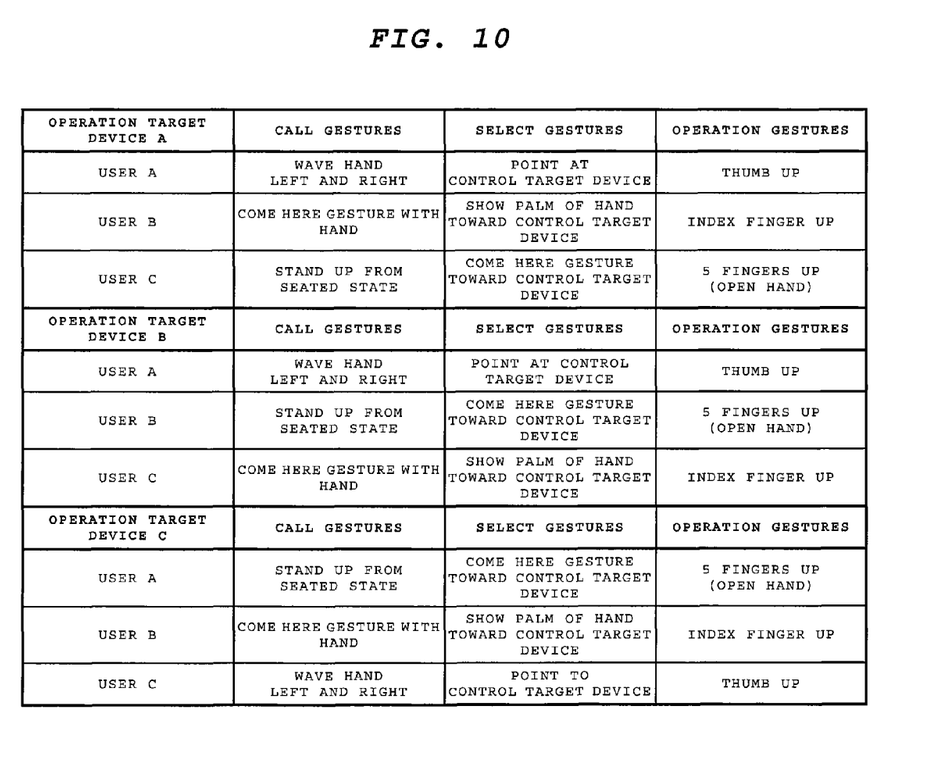
FIG. 10 shows one example of the definition of the gesture for each target device by each user.

The gesture determination section 48, from hand gestures of a user on which image process is performed, determines if the gesture means a "call of device", a "selection of device", or an "operation of device". For this determination, as shown in FIG. 9, the hand gesture and the meaning of the hand gesture, and, as shown in FIG. 10, with respect to each of the multiple users A-C, comparing tables that define the operation corresponding to the different gestures for each control target device (MFP) 11-13 are used. In FIG. 10, regarding call, select, and operate, even if the gestures are different with each other, the same control may be given when the users are different.

The device selection propriety decision section 49 decides if the control target device is in a state in which the device can be called or selected, or not.

The device selection completion notification section 50 notifies the user that there is the control target device which selection is accomplished by the gesture; for example, the indicator lamp 205 and the speaker 22 as shown in FIG. 2 notify it, and the indicator lamp 205 instructs by flashing or lighting, or the speaker 22 instructs by broadcasting a voice message such as "OO San, operation is possible."

The device operation section 51 instructs the MFPs 11-13 which are the control target devices about the control content which is defined according to the gesture.

Figure 5:
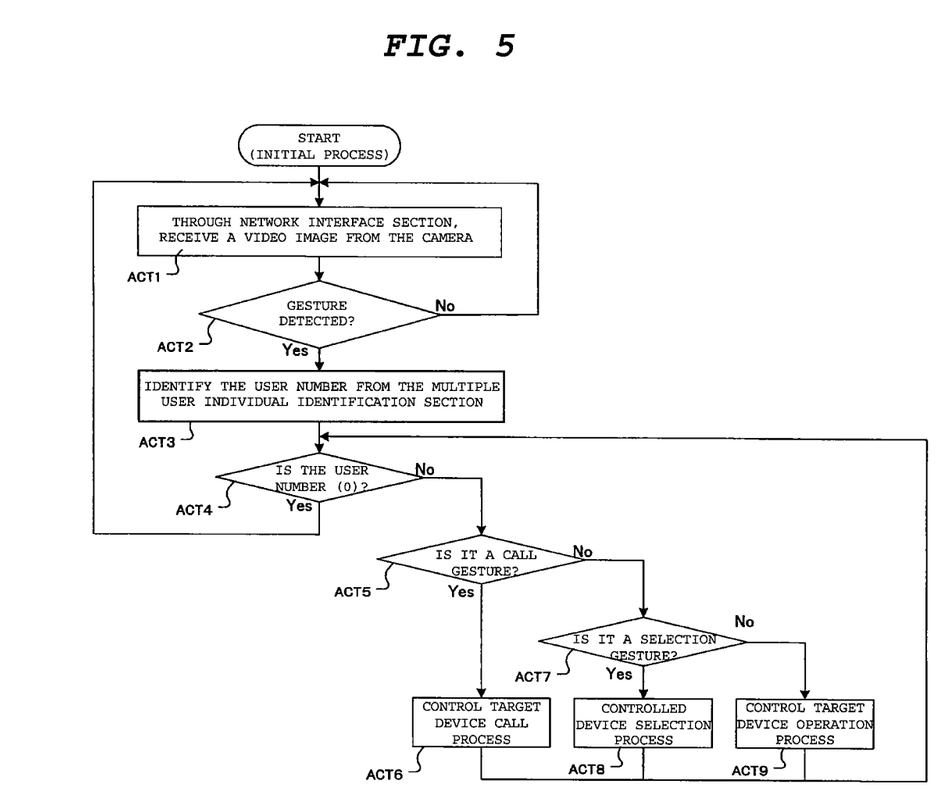
FIG. 5 is a flow chart showing an initial processing flow of the system of FIG. 1.

Next, we will explain the initial process of the selection system of a device by the server 40 based on the flow chart in FIG. 5.

The processor 41 of the server 40 receives a video image (ACT 1) of each gesture from the gesture recognition section 20 of the control target device group 10 through the network interface section 45 and from the outside camera group 60, and then moves to ACT 2.

In ACT 2, the processor 41 determines whether or not the gesture is detected, and when the gesture is detected, forwards to ACT 3.

In ACT 3, the processor 41 recognizes a user number (i.e. a number of gesturing users) using the multiple users individual identification section 46, and moves to ACT 4.

In ACT 4, the processor 41 decides if the user number is zero (0) or not, and, if the user number is not zero moves on to ACT 5 and if the user number is zero moves back to ACT 1.

In ACT 5, when multiple users exist, a decision about whether or not the user's gesture is a call of a control target device is made. If the gesture is a call gesture, the processor 41 moves forward to ACT 6 and executes the call process for the control target device; if the gesture is not a call gesture, then the processor 41 moves to ACT 7.

In ACT 7, the decision is made if the gesture is a selection gesture or not; if the gesture is a selection gesture, then the processor 41 moves to ACT 8 and executes the selection process for the control target device; if the gesture is not a selection gesture, then the processor 41 moves to ACT 9 and executes the operation process for the control target device. Then, after the process is completed in ACT 6, ACT 8, and ACT 9, the processor 41 goes back to ACT 4.

Figure 6:
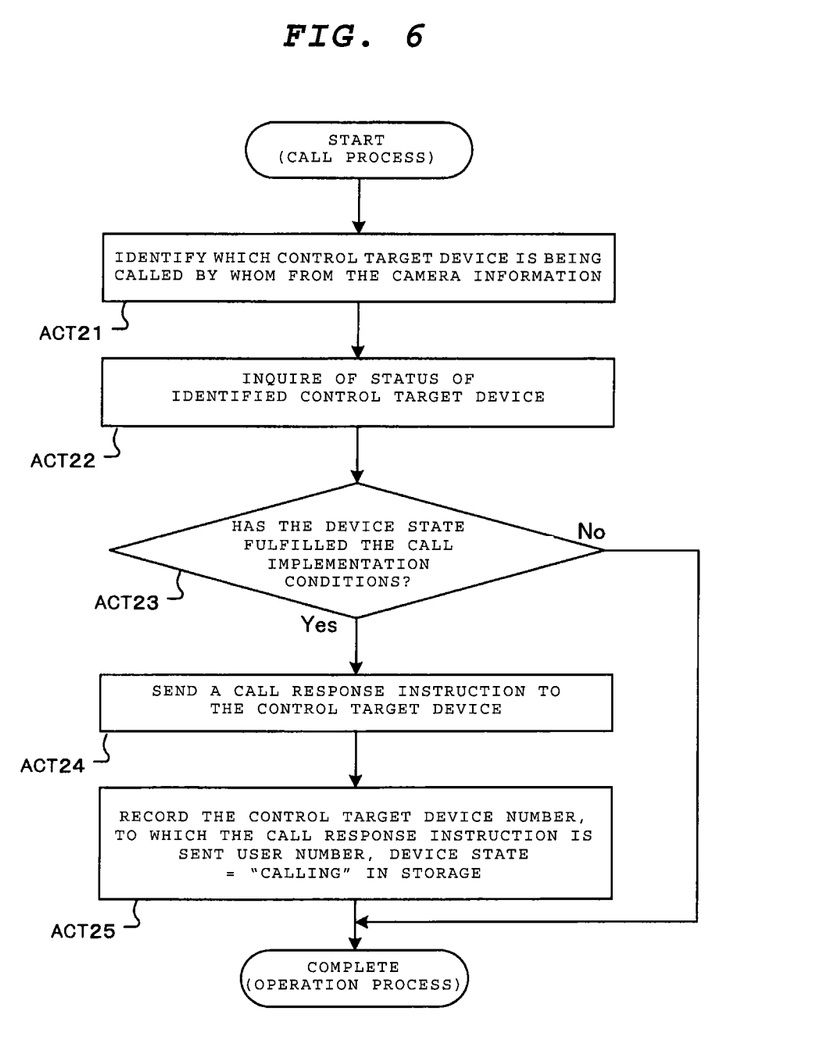
FIG. 6 is a flow chart showing a call process executed in the system of FIG. 1.

Now we will explain about the call process shown in ACT 6 of FIG. 5 based on the flow chart in FIG. 6.

When the call process is started, in ACT 21, the processor 41, from the photographic information from the cameras, identifies who is calling to which control target device, and moves to ACT 22. Here, identification of the control target device is made by determining, for example, if the face orientation of the user being identified is facing toward the control target device or not, or if the gesture of the user being identified is pointed to the control target device or not. The control target can be limited to one device, and also can be multiple devices nearby. That is, it is possible to change the behavior of the system by changing the setting of the whole system. Also, it is possible to determine the identity of the user that is gesturing, by facial recognition, by camera position and angle, and from a seating chart.

In ACT 22, the processor 41 inquires of the status of the identified control target device and moves on to ACT 23.

In ACT 23, when the device status has fulfilled the call implementation condition, the processor 41 moves to ACT 24 and sends a call response instruction to the control target device, and then the processor 41 moves on to ACT 25. As for the call response instruction, the indicator lamp 205 will flash to indicate calling, or the output voice will announce calling from the speaker 22.

Also, in ACT 23, if the call implementation conditions are not met, then this completes this process. As a case that the call implementation conditions are not met, for example, there is a case that the control target device is already in use by another user (in operation).

In ACT 25, the processor 41 records the information temporarily to a storage. For example, the control target device number which received the call instruction, the user number, and the device status="calling" are recorded in the storage, and the processor 41 completes this call process.

Figure 7:
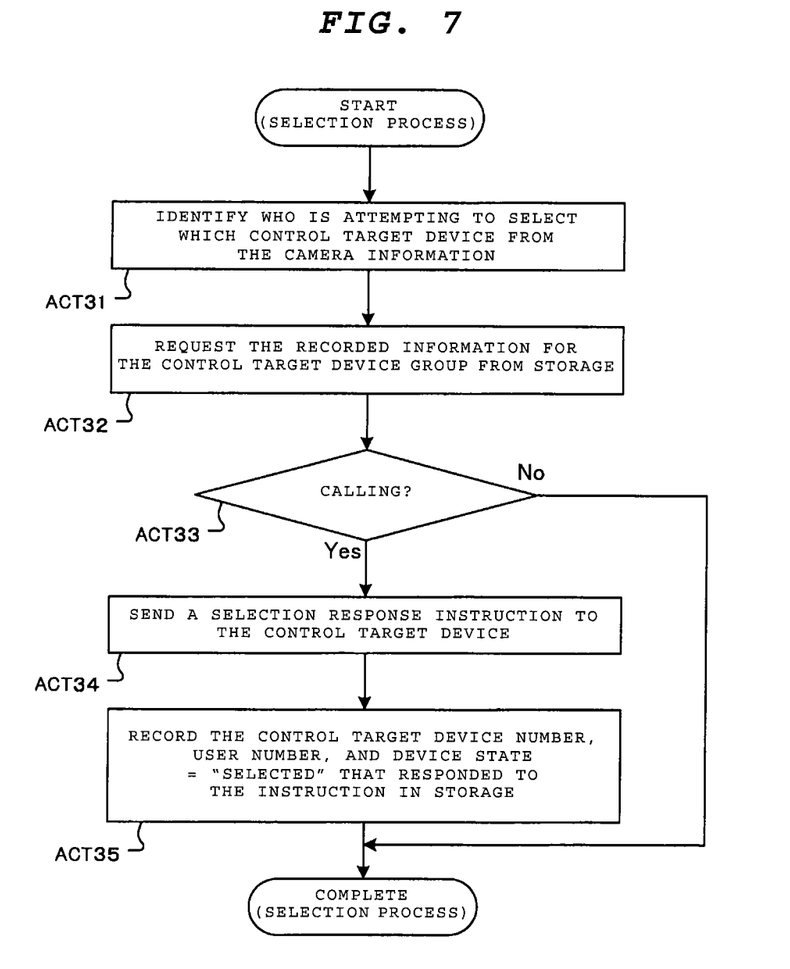
FIG. 7 is a flow chart showing a selection process executed in the system of FIG. 1.

Now we will explain the selection process shown in ACT 8 of FIG. 5 based on the flow chart in FIG. 7.

When the selection process is started, in ACT 31, the processor 41, from the camera's photographic information, identifies who is selecting which control target device and moves on to ACT 32. The identification method is the same as in the call process cases.

In ACT 32, the processor 41 requests the recorded information of the control target device group that is temporarily stored in the storage, and moves on to ACT 33.

In ACT 33, as a result of that inquiry, if a record for the identified control target device exists and if the device status is "calling", the processor 41 moves on to ACT 34; when the device status is selection completed, then this process is completed.

In ACT 34, the processor 41 sends a selection response instruction to the selected control target device and moves on to ACT 35.

In ACT 35, the processor 41 records the information temporarily to the storage. For example, the control target device number that has performed the call instruction, the user identification number, and the device status "selected" are recorded in the storage. Also, the control target device that received the selection response instruction controls the indicator lamp 205 to indicate the selection has been completed, or controls the speaker 22 to announce a voice command saying the selection is completed, and this completes the selection process.

Figure 8:
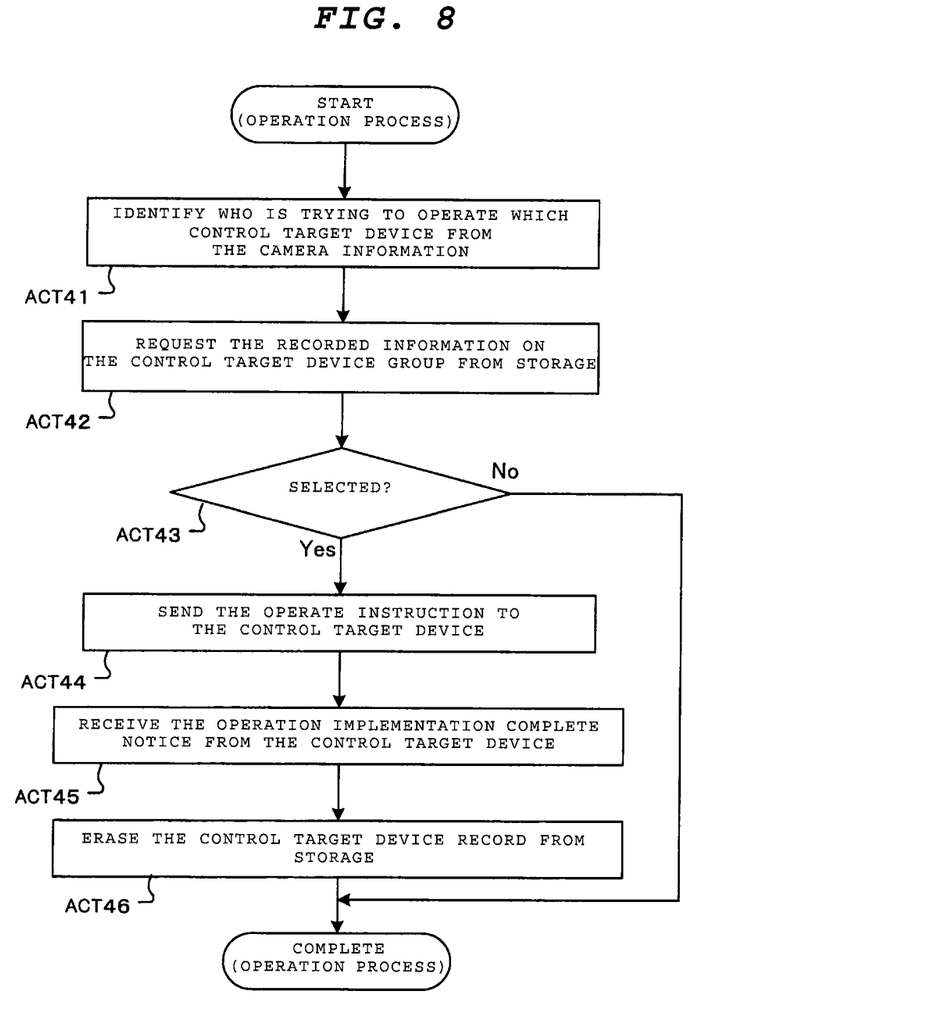
FIG. 8 is a flow chart showing an operation process executed in the system of FIG. 1.

Now we will explain the operation process shown in ACT 9 of FIG. 5 based on the flow chart shown in FIG. 8.

When the operation process is started, the processor 41, from the camera photographic information, identifies who is attempting to operate which control target device, and moves on to ACT 42. The method of the identification process is the same as in the call process.

In ACT 42, the processor 41 requests the recorded information of the control target device that is kept in the storage, and the processor 41 moves on to ACT 43.

In ACT 43, when a record for the identified control target device exists and the device status is "selected", the processor 41 moves on to ACT 44; if not, then this completes the operation process.

An operation instruction for the selected control target device is sent in ACT 44 and then the processor 41 moves on to ACT 45.

In ACT 45, the processor 41 receives, when the operation of the identified control target device is completed, an operation complete notification and then moves on to ACT 46.

In ACT 46, the processor 41 erases the information temporarily recorded in the storage, and this completes the operation process.

Now we will explain the process shown in FIG. 5, while using FIG. 9. In FIG. 9, information defining the relationship between the space hand gestures and the actual operations performed is shown. Here, operations are assigned uniquely with respect to the space hand gestures.

For example, when the A user 81 is using one of the MFPs 11, 12, and 13 to print information stored in the server 40, which MFP is going to be used is unclear; saying, for the time being, to designate that the MFP 11 and the MFP 12 are candidates for use, the A user 81 calls by waving his hand from his desk toward the multiple control target devices MFP 11 and MFP 12 which are placed at a distance. The MFP 11 and the MFP 12 which are called, return an answer (flashing the indicator lamp 205), and then if the user points at the MFP 11, the selection process is carried out; the identified MFP 11 illuminates its indicator lamp 205, and the MFP 12, which is not identified, will turn the indicator lamp 205 off.

The A user 81 now selected the MFP 11. Thus, by the A user 81 giving hand-gestures (thumbs up) for operation implementation to the identified MFP 11, the operation process is carried out. The server 40 receives authentication information from the A user's authentication card through the MFP, and the print job saved in the queue is printed out from the MFP 11.

In this embodiment, in order to allow the multiple users 81, 82, 83 to select the multiple MFPs 11, 12, 13, hand-gestures are assigned as shown in FIG. 10.

Here, the A user 81 and the B user 82 call the same MFP 11 and select it; when the A user 81 tries to use the print function, and the B user 82 tries to use the scanner function, if a new gesture is assigned for multiple functions, it is possible for both to use the MFP 11 at the same time.

Also, when only the MFP 13 includes a developer unit containing the erasable toner, and when the A user 81 and the B user 82 compete to use the erasable printing function, by predetermining the order of priority, the C user 83 can be prevented from intruding.

In order to identify a user that shows the intention to use the multiple control target devices the gesture recognition section 20 has a function of photographing user's face by the camera, and a function of reading space hand gestures as signals of call, select, and operation by the camera with interacting with the server 40.

In the embodiment, a user's hand gestures are used for three instructions such as a selection, a call, and an operation of the device, as shown in FIG. 10, and the user's hand gestures are read by the camera; however, the call, select, and operate instruction signals are not limited to the hand gestures and can, for example, be made by a remote control device equipped with a near infrared light emitter. If a near infrared sensor for the remote control device is placed in the gesture recognition section 20, a call instruction, a select instruction, and an operation instruction, or other instruction signals can be transmitted from the remote control device to the target device together with identification information of the user.

According to the embodiment, as the space hand gestures to control one or more target devices are defined independently with respect to each of the multiple users, each of the users can obtain user authority at the same time independently. Thus, each of the users can instruct the control target device, for which the user obtained the user authority, to execute certain operations related only to the user. For example, the target device can implement only a printing job related to a user of all printing jobs related to the plural users.

Also, when the D user 84 in FIG. 1 is operating using an operation button on the operation panel, or when one user is using the space hand gesture implementation, another user cannot use the same MFP or the same function by using space hand gestures.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system to manage operation of plural devices comprising:
   an acquiring unit configured to acquire information from a user giving a physical signal to use one of the devices;
   a user identification unit configured to identify the user based on the information acquired by the acquiring unit;
   a device identification unit configured to identify a device the user intends to use based on the information acquired by the acquiring unit;
   a signal identification unit configured to identify the physical signal based on the information acquired by the acquiring unit; and
   a control unit configured to recognize the meaning of the physical signal based on the identified user, identified device, and identified physical signal, and transmit a control signal corresponding to the physical signal to the identified device.

2. The system according to claim 1, further comprising:
   a storage unit configured to store information indicating a correlation among an identified user, an identified device, an identified physical signal, and the meaning of the identified physical signal, wherein
   the controlling unit recognizes the meaning of the physical signal by referring to the information stored in the storage unit.

3. The system according to claim 1, wherein
   the information acquired by the acquiring unit is a video image of the user.

4. The system according to claim 3, wherein
   the device identification unit identifies the device the user intends to use, based on at least one of an orientation of the user's face and an orientation of the physical signal.

5. The system according to claim 1, wherein
   the controlling unit is configured to recognize a state of the identified device and to not transmit the control signal to the identified device if the identified device is in a predetermined state.

6. The system according to claim 5, wherein
   the predetermined state is a state in which the identified device is being used by another user.

7. The system according to claim 1, wherein
   the plural devices are data processing devices.

8. The system according to claim 7, further comprising:
   a storage unit configured to store data to be processed by the devices, wherein
   at least one of the devices has an authentication unit configured to authenticate the user intending to use the device, and
   the controlling unit is configured to transmit the data stored in the storage unit to the identified device, in response to the authentication unit of the identified device authenticating the user.

9. A method for managing operation of plural devices comprising:
   acquiring information from a user giving a physical signal to use one of the devices;
   identifying the user based on the information acquired by the acquiring unit;
   identifying a device the user intends to use based on the information acquired by the acquiring unit;
   identifying the physical signal based on the information acquired by the acquiring unit;
   recognizing the meaning of the physical signal based on the identified user, identified device, and identified physical signal; and
   transmitting a control signal corresponding to the physical signal to the identified device.

10. The method according to claim 9, further comprising:
    storing information indicating a correlation among an identified user, an identified device, an identified physical signal, and the meaning of the identified physical signal, wherein
    the meaning of the physical signal is recognized by referring to the stored information.

11. The method according to claim 9, wherein
    the acquired information is a video image of the user.

12. The method according to claim 11, wherein
    the device the user intends to use is identified based on at least one of an orientation of the user's face and an orientation of the physical signal.

13. The method according to claim 9, further comprising:
    recognizing a state of the identified device; and
    determining not to transmit the control signal to the identified device if the identified device is in a predetermined state.

14. The method according to claim 13, wherein
    the predetermined state is a state in which the identified device is used by another user.

15. The method according to claim 9, wherein
    the plural devices are data processing devices.

16. The method according to claim 15, further comprising:
    storing data to be processed by the devices;
    authenticating the user who intends to operate the device; and
    transmitting the stored data to the identified device, in response to the user being authenticated.

17. A non-transitory computer readable medium comprising a program that is executable in a computer system to cause the computer system to perform a method for managing operation of plural devices, the method including the steps of:
    acquiring information from a user giving a physical signal to use one of the devices;
    identifying the user based on the information acquired by the acquiring unit;
    identifying a device the user intends to use based on the information acquired by the acquiring unit;
    identifying the physical signal based on the information acquired by the acquiring unit;

recognizing the meaning of the physical signal based on the identified user, identified device, and identified physical signal; and transmitting a control signal corresponding to the physical signal to the identified device.

18. The non-transitory computer readable medium of claim 17, the method further comprising:

storing information indicating a correlation among an identified user, an identified device, an identified physical signal, and the meaning of the identified physical signal, wherein the meaning of the physical signal is recognized by referring to the stored information.

19. The method according to claim 17, wherein the acquired information is a video image of the user.

20. The method according to claim 19, wherein the device the user intends to use is identified based on at least one of an orientation of the user's face and an orientation of the physical signal.

* * * * *